3,052,608
LANOLIN TRANSPARENT EMULSIONS
Joseph J. Hirsh, 120 W. 42nd St., New York 36, N.Y.
No Drawing. Filed May 7, 1959, Ser. No. 811,519
12 Claims. (Cl. 167—90)

The present invention is directed to aqueous lanolin solutions and to methods for preparing the same.

Lanolin, which is the purified wool fat of sheep, is normally considered to be insoluble in water. Notwithstanding the widespread use of lanolin in ointment bases, cosmetics, leather-dressing, finishing and softening agents, rosin soaps, superfatting toilet soaps, etc., until the present invention, all lanolin-containing aqueous compositions comprised cloudy emulsions or grease-like masses (as opposed to water soluble ethoxylated lanolin derivatives).

This invention has as an object the provision of compositions comprising crystal clear aqueous solutions of lanolin.

This invention has as another object the provision of a method for forming a crystal clear aqueous solution of lanolin.

This invention has as another object the provision of a method for forming crystal clear aqueous solutions of lanolin and higher alcohols and/or esters of the higher alcohols, and to compositions formed thereby.

This invention has as yet another object the provision of cosmetic and pharmaceutical compositions formed from aqueous solutions of lanolin.

Other objects will appear hereinafter.

The lanolin utilized in the compositions and methods of the present invention should preferably be highly fractionated, highly purified lanolin, such as a liquid lanolin fraction miscible in substantially all proportions with mineral oil. Such a liquid lanolin fraction is described in Patent 2,758,125 issued August 7, 1956, or highly pure anhydrous lanolin such as U.S.P. anhydrous lanolin. Lanolin bases may also be used. For example, I have found that the anhydrous lanolin base containing nineteen weight percent total sterols sold under the trademark "Nimco Cholesterol Base P" by N. I. Malmstrom & Company of Brooklyn, New York, is suitable for the purposes of the present invention. Where crude lanolin is used an appreciably higher ratio of Tween 60 solublizing agent must be used.

I have found that Tween 60 manufactured by the Atlas Powder Company of Wilmington, Delaware, is a specific for the compositions and method of the present invention. Tween 60 may be designated as (polyoxyethylene)$_{20}$ sorbitan monostearate. It is a yellow oily liquid having a specific gravity of 1.1, a flash point of about 545° F., and a fire point of about 635° F. It has an acid number of from 0.0 to 2.0, a saponification number of from 45 to 55, and a hydroxyl number of from 81 to 96. Generally, it contains from 2.5 to 3.0 weight percent of water.

I have determined that Tween 60 is unique in respect to the compositions of the present invention. Thus, the closely related Tween 61 sold by Atlas Powder Company of Wilmington, Delaware, which may be designated as (polyoxyethylene)$_4$ sorbitan monostearate was found to be unsatisfactory for the purposes of the present invention. Tween 61 is a tan waxy solid having a specific gravity of 1.06, a flash point of 460° F., and a fire point of 520° F. This material has an acid number of from 0.0 to 2.0, a saponification number of from 98 to 113, and a hydroxyl number of from 170 to 200.

A wide variety of related emulsifying agents sold by Atlas Powder Company of Wilmington, Delaware, have been tested by me and have been found to be unsatisfactory for the purposes of the present invention. These agents have included Tween 20 which is a polyoxyethylene sorbitan monolaurate, Tween 40 which is a polyoxyethylene sorbitan monopalmitate, Tween 21 which is a polyoxyethylene sorbitan monolaurate, Tween 65 which is a polyoxyethylene sorbitan tristearate, Tween 80 which is a polyoxyethylene sorbitan monooleate, Tween 81 which is a polyoxyethylene sorbitan monooleate, Myrj 52 which is a polyoxyethylene stearate, Arlacel 60 which is sorbitan monostearate, G–1441 which is a polyoxyethylene sorbitol lanolin derivative, G–2162 which is a polyoxyethylene oxypropylene stearate and the alkyl phenyl ether of polyethylene glycol.

The chemical characteristics and physical specifications of materials referred to above are set forth in the publication of the Atlas Powder Company of Wilmington, Delaware, entitled: General Characteristics of Atlas Surfactants, which was copyrighted in 1957.

I cannot satisfactorily explain the criticality of Tween 60 as the solubilizing agent, particularly in view of the fact that closely related materials are incapable of accomplishing the formation of crystal clear lanolin solutions.

In all cases the relative concentration of the Tween 60 to the lanolin should be greater than 1 part by weight of Tween 60 to 1 part by weight of lanolin.

When the composition consists solely of Tween 60, lanolin and water, the ratio in weight percentage concentration of the Tween 60 to the lanolin should be at least about five parts by weight of Tween 60 to one part by weight of lanolin, and preferably seven parts by weight of Tween 60 to one part by weight of lanolin. With the liquid lanolin fraction of Patent 2,758,125 under optimum conditions a 5:1 concentration of Tween 60 to lanolin may be used under optimum conditions; with anhydrous lanolin the ratio should be at least 6:1. There is normally little advantage in having the Tween 60 concentration exceed nine to ten parts by weight of Tween 60 per part by weight of lanolin, since the object is to obtain the maximum weight percentage of lanolin in the solution.

In aqueous compositions comprising lanolin and higher fatty alcohol(s), such as cetyl alcohol, lauryl alcohol, myristyl alcohol, palmityl alcohol, or stearyl alcohol, and/or the ester(s) of the fatty acids and alcohols having from 1 to 6 carbon atoms, the solutions may be maintained clear without increasing the relative concentration of the Tween 60 to the lanolin plus the alcohol(s) and/or ester(s), if the concentration of the lanolin is at least two or more times greater than the concentration of the accompanying higher alcohol(s) and/or ester(s). This is apparently due to the solubilizing effect of the lanolin on these materials.

I have discovered that there is a mutual solubilizing effect when lanolin and certain higher fatty alcohols, or animal oils or esters of the fatty acids and alcohols having from one to six carbon atoms or other materials are present, which enables the weight ratio between the Tween 60 and the lanolin to be reduced to in some cases as low as about one and three-quarters to two parts by weight of Tween 60 per one part by weight of total oils and fats including lanolin.

The concentration of water in the compositions of the present invention is not critical where the mixture of the lanolin and Tween 60 prior to dilution with water is crystal clear and is a freely flowing fluid. Thus, with such mixtures, the mixture may be diluted with any amount of water without losing its clarity.

If the mixture prior to dilution consists solely of lanolin and Tween 60 as the active ingredients, it should also contain some water, although the relative amount of water in such mixture may be varied greatly, namely above about five weight percent of water in such mixture.

Where the mixture of lanolin and Tween 60 is an opaque gel, a sufficient amount of water should be added to the mixture to produce a clear solution upon dilution.

A variety of methods within the method of the present invention may be utilized. Thus, the method of the present invention comprehends heating the mixture of lanolin and Tween 60 to an elevated temperature, namely a temperature of the order of 200 to 220° F., and then diluting the so-heated mixture with water and bringing the entire mixture up to a boiling temperature.

If the water is brought up to boiling temperature prior to addition to the heated lanolin and Tween 60 and added slowly to the lanolin and Tween 60 a clearer solution is ultimately obtained than if cold water is used.

The present invention also comprehends the mixing of the lanolin, water, and Tween 60 in a high shear blender, followed by the heating of the mixture to a temperature at or near the boiling point of water, such as a temperature of 200° F. to 212° F. Solutions comprising isopropyl myristate should not be vigorously agitated. The lanolin concentration in the compositions of the present invention may be adjusted by dilution with water to produce crystal clear solutions.

A preferred method of the present invention, and one which has produced excellent compositions is to first blend the Tween 60, lanolin, and other materials at a temperature appreciably above room temperature, but appreciably below the boiling temperature of the mixture, and then either diluting the mixture at such elevated temperature with water and then cooling the resultant composition to room temperature, or cooling the mixture to room temperature (at which temperature it may be stored), and then diluting the mixture with water to form the finished composition, preferably at an elevated temperature, or at the boiling temperature, or diluting the mixture at the elevated temperature and then raising the so-diluted mixture to its boiling temperature.

I have found that an optimum temperature range to effect mixing of the mixture is the temperature range between 150° F. to 160° F., preferably about 158° F. Dilution with water to form the final composition may be accomplished at this temperature, but somewhat better results are normally obtained if the diluted mixture is raised to a boiling temperature.

The compositions of the present invention comprehend the addition of materials such as silicone defoaming agents and the like.

The following examples illustrate the compositions and methods of the present invention:

*Example I*

A clear fluid solution was obtained by heating a mixture of the lanolin oil derived from Patent 2,758,125 with Tween 60, with the relative concentrations in parts by weight being ten parts by weight of the lanolin to seventy parts by weight of the Tween 60 to a temperature of between 200° F. to 210° F., adding distilled water to the extent of twenty parts by weight and heating the combined mixture to boiling temperature. Upon cooling a clear fluid is obtained. Part of the clear fluid was diluted at a temperature of 140° F. to 160° F. with distilled water to a lanolin concentration of two weight percent. This temperature range is optimal with compositions containing minimal amounts of Tween 60. With higher concentrations of Tween 60, other temperatures to boiling temperatures may be used without producing a turbid product. Both the compositions comprising the ten weight percent and two weight percent lanolin mixtures were refrigerated at freezing temperatures, and then brought to room temperature. Both of these mixtures retained their clarity when returned to room temperature.

*Example II*

An opaque gel was obtained when the procedure of Example 1 was varied by decreasing the weight percent concentration of the Tween 60 to sixty parts by weight and increasing the parts by weight of water to thirty. When this opaque gel was diluted with water to form a two weight percent solution, the resultant solution was crystal clear and remained so after being refrigerated and then raised to room temperature.

*Example III*

The criticality of the Tween 60 to lanolin ratio of about six to one was demonstrated by the following experiments: distilled water was added slowly in a thin stream to a mixture of lanolin and Tween 60 in a high shear blender, such as a Waring Blendor. This was continued until inversion took place. Then the balance of water was added. The mixture was agitated at high speed for from five to twenty minutes to produce a cloudy suspension which was clarified on heating the mixture to from 200° F. to 212° F. With the overall aqueous mixture comprising one hundred and fifty parts by weight, the stated amounts of Tween 60 and lanolin with the remainder being water in each of the following instances clarity observations were made: Mixtures comprising forty-five parts by weight of Tween 60 to five parts by weight of lanolin; forty parts by weight of Tween 60 to five parts by weight of lanolin; and thirty-five parts by weight of Tween 60 to five parts by weight of lanolin produced crystal clear solutions. A mixture comprising thirty parts by weight of Tween 60 to five parts by weight of lanolin produced a turbid suspension while a mixture comprising twenty-five parts by weight of Tween 60 to five parts by weight of lanolin produced a cloudy emulsion.

*Example IV*

A crystal clear water soluble solution of lanolin, isopropyl myristate and cetyl alcohol was obtained by mixing ninety parts by weight of Tween 60, fifteen parts by weight of lanolin, seven and a half parts by weight of isopropyl myristate, and one hundred parts by weight of distilled water in a Waring Blendor. Rapid agitation was continued from five to thirty minutes, and then the mixture was heated to a temperature of from 200° F. to 212° F. This produced a crystal clear gel. If desired, two and a half parts by weight of the water may be substituted with two and a half parts by weight of hexaclorophene.

Upon diluting the aforesaid mixture with water it may turn turbid or cloudy at certain dilutions, as for example where the lanolin has a concentration of two weight percent. Under these circumstances, heating of the mixture to the temperature range 200° F. to 212° F. will result in a crystal clear solution which will remain crystal clear after refrigeration and warming to room temperature.

*Example V*

If distilled water is brought to a boiling temperature and added slowly to the lanolin, a clearer solution, gel, or semi-gel is obtained than if cold water is used. Using this technique and generally following the procedure of Example I it was possible to obtain a composition comprising seventy-five parts by weight of Tween 60, fifteen parts by weight of lanolin oil derived from the method of Patent 2,758,125, seven and a half parts by weight of isopropyl myristate, two and a half parts by weight of cetyl alcohol, two and a half parts by weight of hexachlorophene, and twenty-two and a half parts by weight of water.

*Example VI*

Employing the method of Example I but substituting mixtures of the lanolin oil, isopropyl myristate, cetyl alcohol, and hexachlorophene for the lanolin oil, the following composition was obtained which remained crystal clear upon dilution with water: seventy-five parts by weight of Tween 60, fifteen parts by weight of lanolin oil, seven and a half parts by weight of isopropyl myristate, two and a half parts by weight of cetyl alcohol, two and a half parts by weight of hexachlorophene, and two and a half parts by weight of sodium tridecanol polyglycol ether sulfate, and one hundred and ten parts by weight of distilled water.

*Example VII*

The following composition was obtained using the procedure referred to in Example VI: ninety parts by weight of Tween 60, seven and a half parts by weight of isopropyl myristate, two and a half parts by weight of cetyl alcohol, two and a half parts by weight of hexachlorophene, fifteen parts by weight of pale deodorized anhydrous lanolin, and nine-five parts by weight of distilled water. This composition likewise remained clear upon dilution with distilled water.

*Example VIII*

Sixty parts by weight of Tween 60, fifteen parts by weight of lanolin oil derived from the method of Patent 2,758,125, 7.5 parts by weight of isopropyl myristate, and 2.5 parts by weight of cetyl alcohol were mixed together and heated to 158° F., and then allowed to cool. A clear fluid resulted, which when diluted at 212° F. with water to form a two percent solution produced a crystal clear solution. It was determined that a clearer solution is obtained by this method than by the method of Example V. It is to be noted that the ratio between the Tween 60 and the lanolin oil in this example is but four to one, clearly demonstrating the mutual solubilizing effect of the isopropyl myristate and the cetyl alcohol. When the parts by weight of Tween 60 was reduced from sixty to forty-five, a clear semi-gel resulted. However, dilution of this semi-gel with water after heating to a boil produced a somewhat cloudy solution rather than a crystal clear solution, revealing that in this mixture a ratio of four parts by weight of Tween 60 to one part by weight of lanolin oil is required.

*Example IX*

While as indicated in Example VIII, crystal clear solutions may be obtained when lanolin and Tween 60 are mixed together in the absence of water provided that fatty alcohols and/or esters are present, it is not generally advisable to prepare mixtures consisting solely of Tween 60 and lanolin oil in the absence of water. For example, mixtures of Tween 60 to lanolin oil in the weight ratio concentrations of four to one, six to one, and nine to one were prepared in the absence of water. The four to one mixture was a clear fluid, while the six to one and nine to one mixtures were translucent gels. Each of the mixtures were heated to 150° F. and then diluted with water to form two percent solutions, and then heated to 158° F., or to a boil. In each instance the resultant two percent solution was cloudy.

*Example X*

There appears to be some advantage in bringing mixtures consisting essentially of Tween 60 and lanolin oil and water to a boil after the same have been diluted when the mixtures comprise opaque gels. For example, opaque gels were obtained by blending fifty parts by weight of Tween 60, ten parts by weight of lanolin oil, and forty parts by weight of water; or sixty parts by weight of Tween 60, ten parts by weight of lanolin, and thirty parts by weight of water; or seventy parts by weight of Tween 60, ten parts by weight of lanolin oil, and twenty parts by weight of water. When such opaque gels were diluted with water to two percent and heated to 158° F., the gel having sixty parts by weight of Tween 60 formed a clear solution, and the gel having seventy parts by weight of Tween 60 formed a crystal clear solution. The gel having fifty parts by weight of Tween 60 formed a cloudy solution. However, when the procedure was varied so that the gels were diluted to two percent with water and then heated to a boil, both the gels formed from the sixty parts by weight of Tween 60 and the seventy parts by weight of Tween 60 formed crystal clear solutions. The gel formed from fifty parts by weight of Tween 60 however produced a cloudy solution.

*Example XI*

When the mixture of Tween 60 and lanolin oil and water is formed, in those embodiments of the present invention in which the same are formed by combining Tween 60 and lanolin oil on the one hand with water on the other hand prior to dilution, the mixture should not be boiled after being blended. Thus, a crystal clear solution is obtained with a mixture of Tween 60 and lanolin oil and of water which had been separately boiled, and then combined, and then diluted to two percent with further water and then boiled at 212° F. A clear solution was obtained with a similar concentration of components, but with the water in the mixture being at room temperature at the time of combination, and with no boiling of the combined mixture prior to dilution. However, where the combined mixture was boiled for five minutes after the water was added to the mix of Tween 60 and lanolin oil a cloudy solution was obtained after dilution and boiling.

*Example XII*

The mutual solubilization effect heretofore alluded to may be clearly demonstrated in this example.

A mixture of sixty parts by weight of Tween 60, fifteen parts by weight of lanolin oil, and 7.5 parts by weight of isopropyl myristate produced a clear fluid. However, when this clear fluid was diluted with water to a two percent concentration and brought to a boil it produced a cloudy solution.

In comparison, a mixture of sixty parts by weight of Tween 60, fifteen parts by weight of lanolin oil, 7.5 parts by weight of isopropyl myristate, and 2.5 parts by weight of cetyl alcohol, which likewise produced a clear fluid, when diluted to two percent with water and brought to a boil produced a crystal clear solution. Accordingly, although cetyl alcohol produces a cloudy solution, being substantially insoluble in water, in admixture with the lanolin oil and isopropyl myristate and the Tween 60 it produces a clear solution.

*Example XIII*

The complexity of the mutual solubilization effect will be made clear from the following comparisons:

A mixture of sixty parts by weight of Tween 60, fifteen parts by weight of lanolin oil, 7.5 parts by weight of isopropyl myristate, 2.5 parts by weight of cetyl alcohol, and 1.2 parts by weight of hexachlorophene produced a clear fluid which on dilution with water to two percent and being brought to a boil produced an opaque mixture. The substitution of seventy-five parts by weight for the sixty parts by weight of Tween 60 produced but a cloudy mixture when diluted as aforesaid. However, the substitution of 7.5 parts by weight of oil of mink for 7.5 parts by weight of the fifteen parts by weight of lanolin oil produced a clear fluid which remained clear when diluted with water as aforesaid. Raising the weight concentration of Tween 60 to ninety parts by weight produced a crystal clear solution both with the mixture comprising fifteen parts by weight of lanolin oil and with the mixture comprising 7.5 parts by weight of lanolin oil and 7.5 parts by weight of oil of mink.

Example XIV

As heretofore noted, it is not satisfactory to prepare mixtures of Tween 60, and lanolin oil, without water being present in the absence of other materials prior to dilution. However, the same is not applicable to mixtures of lanolin and oil of mink. For example, a crystal clear fluid was obtained by mixing twenty-five parts by weight of Tween 60 with 2.5 parts by weight of oil of mink and 2.5 parts by weight of lanolin oil. This produced a clear solution when diluted with water to a two percent concentration, with the diluted mixture being boiled. However, surprisingly, oil of mink by itself with Tween 60 requires a much higher ratio of Tween 60 to it than does lanolin and Tween 60 to produce crystal clear solutions using the process of the present invention. For example, a minimum ratio of eight parts by weight of Tween 60 to one part by weight of oil of mink was required to solubilize the oil of mink on dilution with water. This minimum ratio however is surprisingly reduced to six parts by weight of Tween 60 to one part by weight of an even mixture of oil of mink and lanolin oil when the mixture of oil of mink and lanolin oil is utilized.

Mixtures of oil of mink and lanolin oil may be solubilized in the presence of Tween 60, even though water is not present prior to dilution. For example, a mixture of thirty parts by weight of Tween 60, 2.5 parts by weight of lanolin oil, and 2.5 parts by weight of oil of mink was heated to 158° F. and then diluted with water to a two percent concentration of total active ingredients and heated to a boil. This produced a crystal clear solution.

Example XV

Arlex which is a solution containing eighty-three percent of solids and consisting of sorbitol and related polyhydric materials has no noticeable emulsifying action on lanolin oil by itself. However, Arlex in conjunction with Tween 60 serves to produce clear solutions even when the concentration of Tween 60 by itself is appreciably below that which would produce a clear solution.

For example, a mixture of sixty parts by weight of Tween 60, fifteen parts by weight of lanolin oil, 7.5 parts by weight of isopropyl myristate, 2.5 parts by weight of cetyl alcohol, and 1.2 parts by weight of hexachlorophene produced a translucent fluid on being heated to 158° F. Dilution of this fluid to a two weight percent concentration of total active ingredients in water and heating it to a boil produced a cloudy solution. On the other hand, repeating the precise procedure but including with the mixture one part by weight of Arlex produced a crystal clear solution. The synergistic affect of the Arlex at this concentration is remarkable, since the Arlex is present in but one part by weight to sixty parts by weight of Tween 60.

The solutions of the present invention have excellent shelf life, and hold up well under normal storage conditions at room temperature.

The crystal clear solutions of the present invention may be utilized in a wide variety of useful compositions. By way of illustration and not by way of limitation, formulations comprising a skin conditioner containing an aqueous mixture including within a thousand parts by weight some ten parts by weight of lanolin oil and ninety parts by weight of Tween 60 have been effected, such skin conditioners also including thickening agents such as carboxymethyl cellulose, sorbic acid, and water soluble waxes. Alternatively, the lanolin solutions of the present invention may be incorporated into a wide variety of shampoo solutions comprising ethanolamine homologs.

Of necessity, the presentation of examples of the subject invention is limited, due to the almost infinite number of varieties of possible combinations encompassed within the subject invention. However, a wide variety of esters of the higher fatty acids and alkyl alcohols having from one to six carbon atoms were tested with the Tween 60 and the lanolin oil compositions of the present invention with success.

The present invention may be embodied in other specific forms without departing from the spirit or essential attributes thereof and, accordingly, reference should be made to the appended claims, rather than to the foregoing specification as indicating the scope of the invention.

The word "solution" as used in the aforementioned specification is not to be construed as meaning a "true" solution in the narrow sense, but is to be construed as meaning a mixture which appears to the naked eye to be a solution, and accordingly, the word "solution" is to be construed as covering transparent emulsions.

This application is a continuation in part of my patent application Serial No. 728,078, filed April 14, 1958, now abandoned.

I claim:

1. A crystal clear aqueous solution consisting essentially of water, lanolin, and (polyoxyethylene)$_{20}$ sorbitan monostearate, with the weight ratio of the (polyoxyethylene)$_{20}$ sorbitan monostearate to the lanolin being greater than 1 part by weight of the (polyoxyethylene)$_{20}$ sorbitan monostearate to 1 part by weight of lanolin.

2. A crystal clear aqueous solution in accordance with claim 1 in which the weight ratio of the (polyoxyethylene)$_{20}$ sorbitan monostearate to the lanolin is at least five to one.

3. A crystal clear aqueous solution in accordance with claim 2 in which the weight ratio between the (polyoxyethylene)$_{20}$ sorbitan monostearate to lanolin is between 10:1 to 5:1.

4. A crystal clear aqueous solution in accordance with claim 1 and further containing isopropyl myristate.

5. A crystal clear aqueous solution in accordance with claim 1 and further containing cetyl alcohol.

6. A crystal clear aqueous solution in accordance with claim 1 and further containing an ester selected from the group consisting of the esters of the higher fatty acids and alcohols having from 1 to 6 carbon atoms.

7. A crystal clear aqueous solution in accordance with claim 1 and further containing a compound selected from the group consisting of the higher fatty alcohols.

8. A crystal clear aqueous solution in accordance with claim 1 and further containing sorbitol, in which the concentration of sorbitol is appreciably below the concentration of the (polyoxyethylene)$_{20}$ sorbitan monostearate.

9. The method of forming a crystal clear solution of water, lanolin, and (polyoxyethylene)$_{20}$ sorbitan monostearate and lanolin with the weight ratio of the (polyoxyethylene)$_{20}$ sorbitan monostearate to the lanolin being greater than 1 to 1, consisting essentially of mixing water, lanolin, and (polyoxyethylene)$_{20}$ sorbitan monostearate together, heating such mixture to a temperature between a temperature appreciably above room temperature and the boiling temperature of the mixture, and then diluting the mixture with water to produce a crystal clear mixture.

10. The method in accordance with claim 9 in which the (polyoxyethylene)$_{20}$ sorbitan monostearate, lanolin, and water are first mixed at a temperature within the range of 150° F. to 160° F., and then such mixture is diluted with water.

11. The method in accordance with claim 9 in which lanolin and (polyoxyethylene)$_{20}$ sorbitan monostearate is heated to a temperature within the range 200° F., and then diluted with water.

12. The method in accordance with claim 9 in which lanolin, (polyoxyethylene)$_{20}$ sorbitan monostearate, and a compound selected from the group consisting of the higher fatty alcohols, and the esters of the higher fatty acids and alcohols having from 1 to 6 carbon atoms are mixed in the absence of water, and then diluted with water.

(References on following page)

References Cited in the file of this patent

UNITED STATES PATENTS

| | | |
|---|---|---|
| 2,478,820 | Griffin | Aug. 9, 1949 |
| 2,498,727 | Verblen | Feb. 28, 1950 |

OTHER REFERENCES

Sorbitol, Typical Cosmetic Formulations Illustrating the Use of Atlas Sorbitol and Surfactants, February 1957, Booklet No. CD–93 C–15 M–2–57, 32 page booklet, pages 20–23 relied upon.

Atlas Guide to Cosmetics and Pharmaceutical Formulation With Atlas Products, April 1954, Booklet No. CD 72 (Rev.)–7500–4–54, pages 18–20 and 22.

Spalton: Pharmaceutical Emulsions and Em. Agts., Chemist and Druggist, London (1956), pages 18–19.

Sagarin: Cosmetics, Science and Technology, Interscience Publishers Inc., N.Y. (September 16, 1957), pp. 1026–1028.